(12) United States Patent
Zink

(10) Patent No.: US 12,311,412 B2
(45) Date of Patent: May 27, 2025

(54) BATTERY ELECTRIC HIGH PRESSURE FLUID PUMP SYSTEM FOR INDUSTRIAL CLEANING OPERATIONS

(71) Applicant: STONEAGE, INC., Durango, CO (US)

(72) Inventor: Gerald P. Zink, Durango, CO (US)

(73) Assignee: STONEAGE, INC., Durango, CO (US)

( * ) Notice: Subject to any disclaimer, the term of this patent is extended or adjusted under 35 U.S.C. 154(b) by 61 days.

(21) Appl. No.: 18/131,091

(22) Filed: Apr. 5, 2023

(65) Prior Publication Data

US 2023/0321695 A1 Oct. 12, 2023

Related U.S. Application Data

(60) Provisional application No. 63/327,933, filed on Apr. 6, 2022.

(51) Int. Cl.
| | |
|---|---|
| *H01M 50/204* | (2021.01) |
| *B08B 3/02* | (2006.01) |
| *H01M 50/258* | (2021.01) |
| *H01M 50/51* | (2021.01) |
| *F28G 9/00* | (2006.01) |

(52) U.S. Cl.
CPC ............. *B08B 3/02* (2013.01); *H01M 50/204* (2021.01); *H01M 50/258* (2021.01); *H01M 50/51* (2021.01); *B08B 2203/0223* (2013.01); *B08B 2203/027* (2013.01); *F28G 9/00* (2013.01)

(58) Field of Classification Search
CPC .............. B08B 3/02; B08B 2203/0223; B08B 2203/027; H01M 50/258; H01M 50/51; H01M 50/204; F28G 9/00
See application file for complete search history.

(56) References Cited

U.S. PATENT DOCUMENTS

| | | | |
|---|---|---|---|
| 11,715,963 B1* | 8/2023 | Hays ..................... | H02J 7/0042 169/54 |
| 2016/0221843 A1* | 8/2016 | Acernese ................ | C02F 1/441 |
| 2019/0299236 A1* | 10/2019 | Rancourt ................ | F04B 17/05 |
| 2021/0376396 A1* | 12/2021 | Burns ................... | H02J 7/0013 |
| 2024/0424951 A1* | 12/2024 | Tamba ................ | H01M 50/249 |

* cited by examiner

*Primary Examiner* — P. Macade Nichols
(74) *Attorney, Agent, or Firm* — Stephen Y. Liu; Carstens, Allen & Gourley, LLP

(57) ABSTRACT

A high-pressure fluid supply system and apparatus including a battery electric powered high pressure fluid pump that can be located in proximity to a piece of equipment such as a heat exchanger in an industrial plant in need of being cleaned wherein the system is modularized on a plurality of pallets capable of being transported in the industrial plant elevator to a location near the heat exchanger location.

17 Claims, 4 Drawing Sheets

BATTERY ELECTRIC HIGH PRESSURE FLUID PUMP SYSTEM FOR INDUSTRIAL CLEANING OPERATIONS

TECHNICAL FIELD

Aspects of the present disclosure relate to a high-pressure fluid supply system. More particularly, the present disclosure is directed to a modularized, battery-powered system configured to provide a high-pressure supply of fluid to locations that are not conveniently accessible to conventional diesel-powered fluid supply systems.

BACKGROUND OF THE DISCLOSURE

The present disclosure is directed to high pressure water flexible lance cleaning systems including in-situ piping, processing machinery, structural maintenance and remediation activities. Embodiments of the present disclosure are directed to a compact high pressure fluid pump apparatus capable of being deployed close to an intended target such as an in-situ heat exchanger within an industrial plant.

Most industrial plants in which heat exchangers are utilized are multistory buildings and structures. Such buildings and structures are designed to have freight elevators via which tools, personnel and parts may be raised to various floor levels within the building.

Structure maintenance and remediation activities in need of high-pressure fluid process tools and activities such as concrete, asbestos, lead paint removal, etc. require use of high-pressure pumps. Most commercial, medical, residential, underground or municipal venues have noise/exhaust/fuel/oxygen consumption/heat emission concerns which require remote placement of an engine driven high pressure pump and thus require substantial distances of exposed high-pressure hoses. Often in such situations, electrical power from the normal electrical grid is absent or of insufficient power or used only for a short time, with a high cost of electrical hook-up.

For example, such a building may have multiple levels and a typical heat exchanger which requires periodic cleaning may be located or at least accessed from one of the upper floors within the building. Conventional high-pressure pumps, capable of delivering fluid at operating pressures from 5000 to 40000 psig, are typically positive displacement, diesel driven pumps, and are typically located in a well-ventilated space, or outdoors, adjacent the building. Furthermore, a diesel engine is extremely heavy and large.

An example of a conventional, mobile high-pressure, diesel-driven pump is shown in FIG. 4. The diesel-driven pumping system 400 includes a trailer 402 supporting a large diesel fuel tank connected to a diesel engine that powers a high-pressure pump. The size and weight of the diesel-driven pumping system 400 prevents it from being brought into close proximity to the equipment in need of cleaning. In operation, the diesel-driven pumping system 400 is often parked a significant distance away from the equipment (e.g., a heat exchanger) to be cleaned, requiring hoses to be snaked throughout the building and up to the floor where the heat exchanger access is located. This typically involves running high pressure hose hundreds of feet from the pump, through the building passageways, up through various building openings and eventually to the apparatus for feeding the flexible lances into and out of the heat exchanger tubes. Since these hoses supply fluid at extremely high pressures, great care must be taken to ensure that these hoses are not damaged. Thus, the longer the distance the greater the risk to personnel should a hose break occur. Furthermore, since these pumps are diesel driven, there is a substantial environmental hazard associated with operation of the diesel engines. Fuel storage, noise, oil supply and exhaust concerns all must all be handled and adequately addressed.

Furthermore, many of the couplings, e.g., hoses strung between remote pumps and end use high-pressure fluid cleaning tools which have been used in the industry for decades are soon-to-be removed from service. Even after these couplings are removed from service, hoses that remain are still dangerous. When waterblasting is done in-situ, the industrial plant is usually in a shutdown state, known as a "turnaround". The high-pressure hoses strung from a distant diesel operated pump into the structure necessarily occupy the same areas used and traversed by many unrelated workers going about other maintenance activities. In fact, it is impractical to barricade the hose path during a turnaround. Therefore, there is large exposure of all personnel to these hoses and thus presents a waterjetting hazard.

SUMMARY OF THE DISCLOSURE

The present disclosure directly addresses such needs. An exemplary embodiment of a high-pressure fluid supply system in accordance with the present disclosure includes a palletized battery operated high pressure pump that is connectable to a conventional low pressure water source of fluid such as facility water. The system and apparatus comprises a high-pressure positive displacement fluid pump driven by an electric motor through an appropriate transmission arranged on a single fork lift pallet and one or more battery module pallets, such as a lithium iron phosphate (LiFePO4) battery module pallets, configured to be connectable to the motor as needed. This system can be operated and controlled by the nozzle operator through electronic remote control means. The water flow can be started and stopped frequently with a single button or signal and sent to desired pressure or flow rate and reported via graphic interface to the operator and transmitted to offsite supervision and record keeping functions. Water and energy are conserved by being consumed only in the needed amount and duration, e.g., no engine idling or water bypassing or pressure dumping, as is currently necessary with conventional configurations. Finally, pressure can be ramped up and down gradually to reduce fatigue on pressure components, and to remove shock from thrust at nozzle positioner structures.

Each of the pallets is sized to fit within a plant freight elevator and lifted to the floor providing closest access to the heat exchanger in need of being cleaned. For example, such a pallet may be 31 inches deep by 50 inches wide and have suitable fork lift pockets for the tines of a conventional fork lift to lift and maneuver the pallet onto and off of the elevator.

Further features, advantages and characteristics of the embodiments of this disclosure will be apparent from reading the following detailed description when taken in conjunction with the drawing figures.

DETAILED DESCRIPTION

Aspects of the present disclosure recognizes the need for a compact, high-pressure pump apparatus and system that avoids the necessity of a remote diesel engine pump and can be transported to a position in relatively close proximity to a target, such as a heat exchanger in need of cleaning, within an industrial plant setting.

Figure 1:
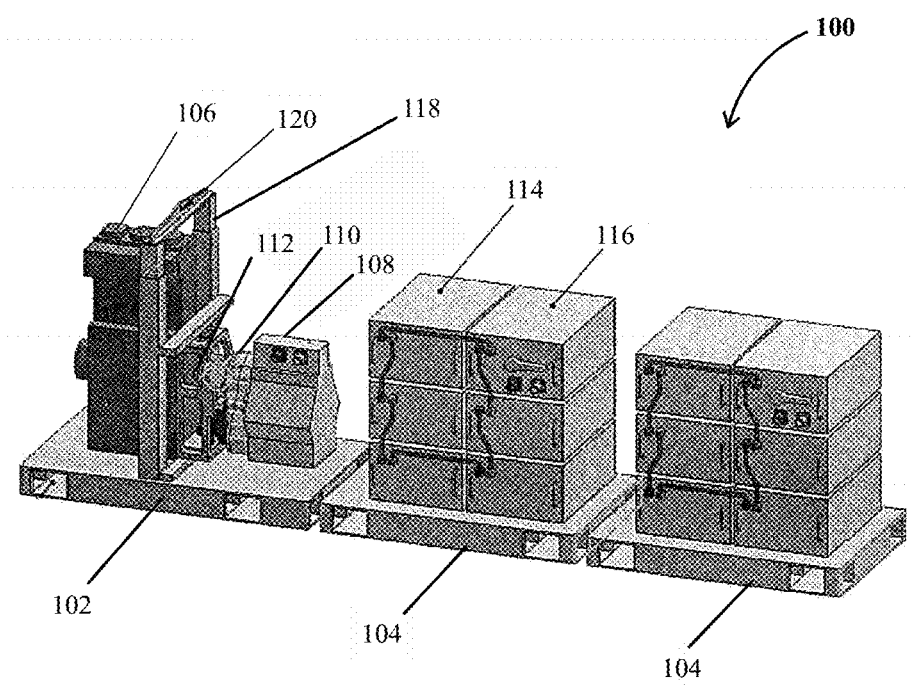
FIG. 1 is a perspective view of an exemplary embodiment of the components of a battery electric high pressure pump apparatus in accordance with the present disclosure.

FIG. 1 is a perspective view of the major components of a battery electric high pressure pump apparatus and system 100 in accordance with an exemplary embodiment of the present disclosure. A high pressure positive displacement pump pallet 102 is arranged next to a first battery module pallet 104 and a second battery module pallet 104. Each of these pump and battery module pallets weighs about 1500 pounds and can be readily separately carried in an industrial freight elevator from ground level up to or down within an industrial plant to a plant level at which the target heat exchanger access is located.

Although pallets 102 are shown, this is merely exemplary. For example, one possible configuration includes a flatter rectangular shaped battery supported on a slab or other support in place of a pallet. Thus the pallet 102 is simply a self-contained module that can be readily transported as needed via a pallet jack, hoisting or skidding on a support surface.

Figure 2:
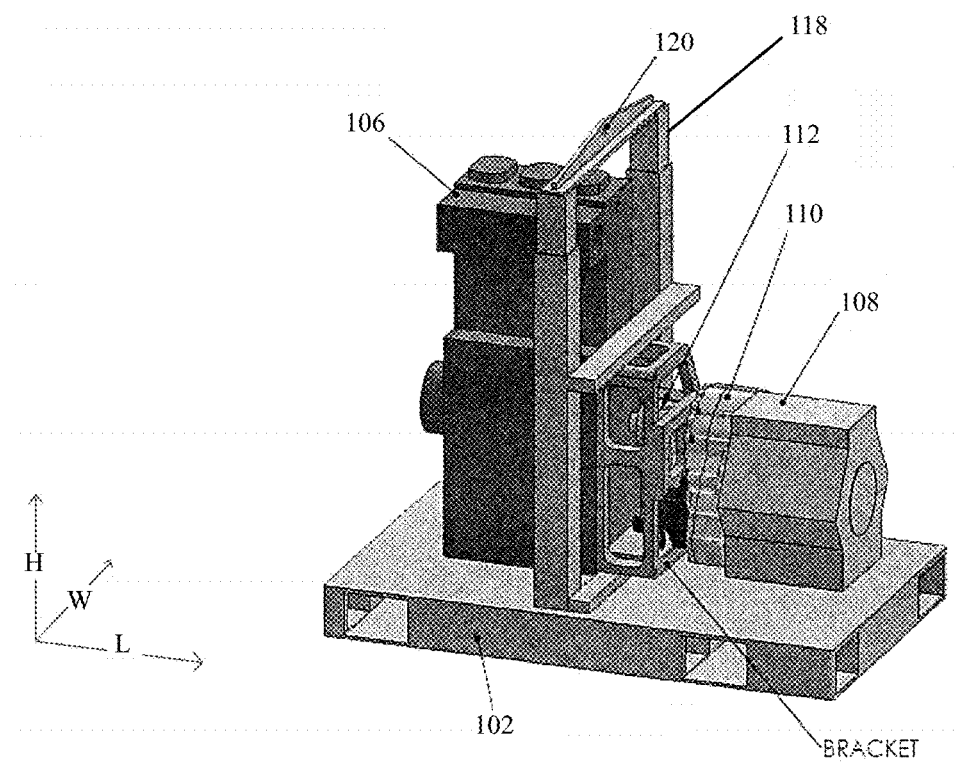
FIG. 2 is a separate perspective view of the motor/pump pallet of the battery electrical apparatus shown in FIG. 1.

FIG. 2 is a separate perspective view of the high-pressure pump pallet 102. The pump pallet 102 carries a high pressure pump 106 driven by an electric motor (108) capable of generating fluid pressure of, for example, 40,000 psi and feeding fluid through one or more high pressure hoses to an indexing apparatus adjacent a heat exchanger. One such indexing apparatus is disclosed in our U.S. patent application Ser. No. 17/004,934, filed Aug. 27, 2020. The pump 106 has a height dimension that is greater than its length and width dimensions, which reduces the overall footprint of the high-pressure pump pallet 102. The reduced footprint allows the high-pressure pump pallet 102 to be loaded onto conventional freight elevators.

High pressure pump 106 is driven by a motor 108 such as a polyphase motor pack. One appropriate example is an iM-225 Integrated Module inverter/motor available from Cascadia Motion of Portland, Oregon. The output of the iM-225 is then fed through a speed reducer 110 and a shaft coupling 112, all of which are also mounted together on the pallet 102 along with the pump 106. This exemplary pallet 102 may have dimensions of about 31 inches by 72 inches such that it can easily fit onto an onsite freight elevator via a conventional forklift. On exemplary high-pressure pump 106 may be a Triplex plunger pump model K18000-36 available from German company KAMAT GmbH & Co. KG.

In the non-limiting example shown in this disclosure, the high-pressure pump pallet 102 includes a lifting bracket 118 with a lifting eye 120 so that the high-pressure pump pallet 102 can be easily hoisted.

Figure 3:
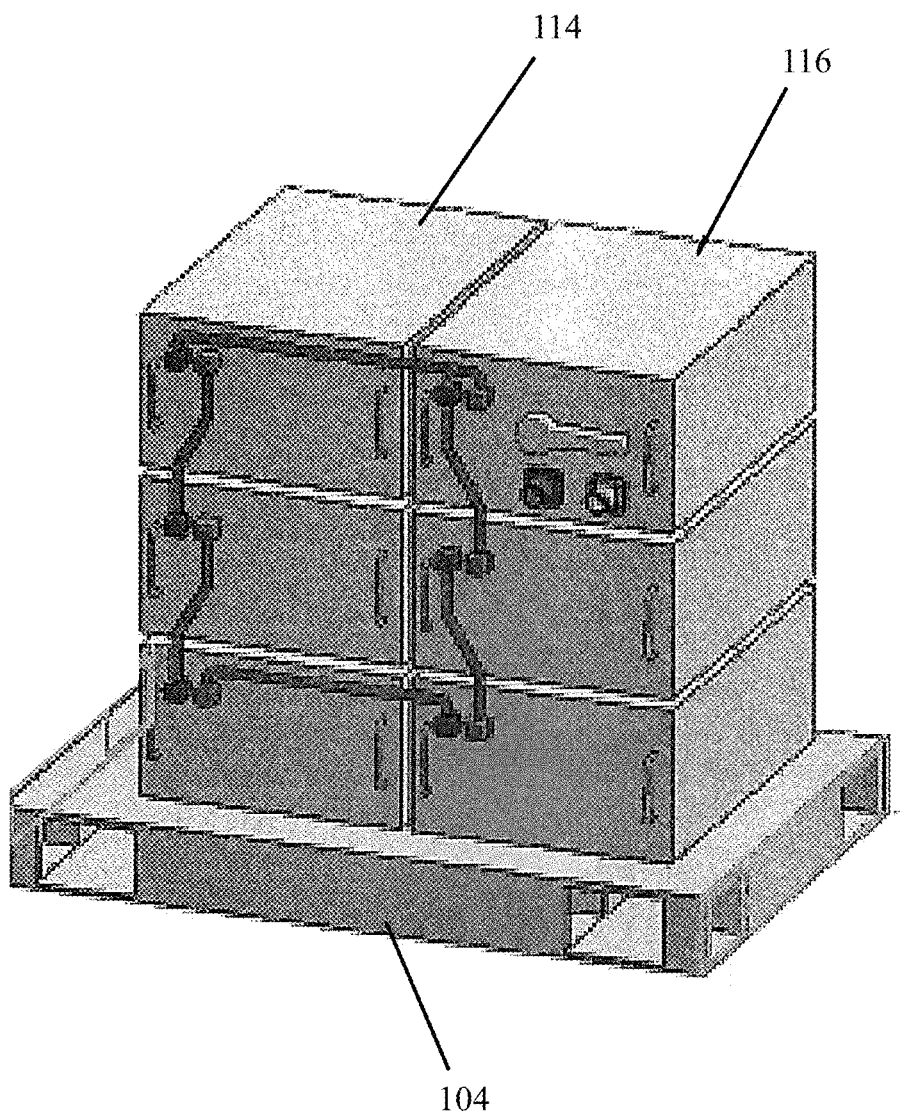
FIG. 3 is a separate perspective view of one of the battery module pallets in accordance with the present disclosure.
Figure 4:
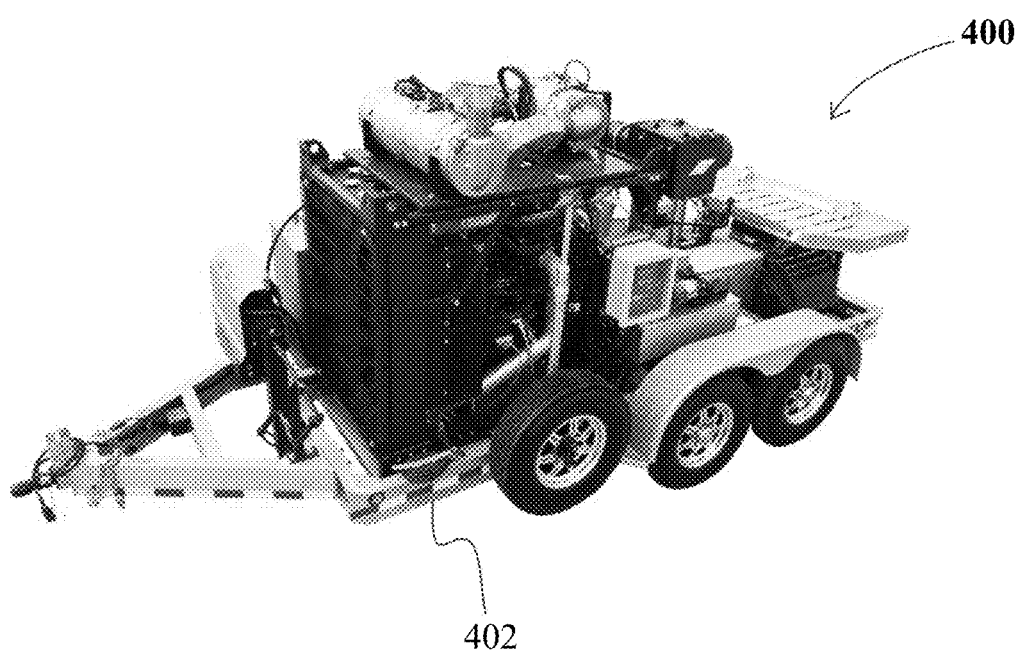
FIG. 4 is a perspective view of a conventional, portable diesel pump used to provide a high-pressure fluid for use in cleaning equipment.

A separate perspective view of an exemplary one of the battery pallets 104 is shown in FIG. 3. Each battery pallet 104, for example, may preferably carry a stack 114 of 5 serially connected 45-volt LiFePO4 batteries that in two pallets together provide a total of 10 modules. Both pallets together are configured to generate a constant 450 volt at 300 amp continuous supply for a continuous operating period of about 2 hours. It should be understood that FIG. 3 is merely exemplary. One exemplary supplier of these LiFePO4 battery modules is RJ Energy Co., Ltd, a custom battery manufacturer located in China. Also included in each battery pallet 104 is a single or three phase charger/disconnect module 116 for fast recharging the battery stack 114 from available on-site AC power. Other stack configurations are envisioned as within the present disclosure. Each battery pallet 104 is designed to weigh about 1500 pounds such that a number of battery pallets 104 can be hooked together to the DC motor 108 on the high-pressure pump 106 as may be needed for a cleaning operation contemplated.

Many changes may be made to any one of the components of system 100 described above which will become apparent to one reading the above disclosure. All such changes, alternatives and equivalents in accordance with the features and benefits described herein, are within the scope of the present disclosure. Such changes and alternatives may be introduced without departing from the spirit and broad scope of our disclosure as defined by the claims below and their equivalents.

What is claimed is:

1. A high-pressure fluid supply system comprising:
   a high-pressure pump pallet supporting a high-pressure fluid pump and a battery-powered motor connected to the high-pressure fluid pump; and
   at least one modular battery pallet that is independently movable relative to the high-pressure pump pallet, wherein the at least one modular battery pallet supports one or more batteries configured to power the battery-powered motor on the high-pressure pump pallet, and wherein a first modular battery pallet of the at least one modular battery pallet is configured to be electrically coupled at least to the battery-powered motor.

2. The high-pressure fluid supply system of claim 1, wherein the at least one modular battery pallet includes a second modular battery pallet configured to be electrically coupled to the first modular battery pallet.

3. The high-pressure fluid supply system of claim 2, wherein:
   each of the at least one modular battery pallet supports a plurality of batteries configured to provide a respective electrical output;
   the plurality of batteries of each of the at least one modular battery pallets are electrically coupled together to provide an overall electrical output based on the respective electrical outputs; and
   the overall electrical output is provided to the electrically-powered motor from an electrical coupling between the plurality of batteries of the first modular battery pallet.

4. The high-pressure fluid supply system of claim 3, wherein the plurality of batteries of each of the at least one modular battery pallet is connected in series to provide the respective electrical output, and wherein each of the plurality of batteries are connected in series to provide the overall electrical output based on the respective electrical outputs.

5. The high-pressure fluid supply system of claim 1, wherein the high-pressure fluid pump is a positive displacement pump, and wherein the motor is a polyphase motor.

6. The high-pressure fluid supply system of claim 1, wherein the high-pressure pump has a height dimension that is greater than its length and width dimensions to reduce a footprint of the high-pressure pump pallet.

7. The high-pressure fluid supply system of claim 1, wherein the high-pressure fluid pump and the battery-powered motor are arranged on the high-pressure pump pallet so that the arrangement has dimensions L×W×H such that:
L>H>W, and
0.75L>H>0.67L.

8. The high-pressure fluid supply system of claim 1, further comprising one or more flexible lance hoses fluidically connected to the high-pressure pump fluid pump.

9. The high-pressure fluid supply system of claim 1, wherein the high-pressure pump provides 5,000-40,000 PSI.

10. The high-pressure fluid supply system of claim 1, wherein the high-pressure pump pallet comprises a lifting bracket with a lifting eye for hoisting the high-pressure pump pallet.

11. The high-pressure fluid supply system of claim 1, wherein the at least one modular battery pallet is configured to power the battery-powered motor from a location remote to the high-pressure pump pallet.

12. The high-pressure fluid supply system of claim 1, wherein each pallet weighs no more than 1500 pounds.

13. The high-pressure fluid supply system of claim 1, wherein each modular battery pallet carries a stack of five 48-volt Lithium Iron Phosphate batteries connected in series and a charger/disconnect module.

14. A method for operating a high-pressure fluid supply system, the method comprising:
delivering a high-pressure pump pallet to a venue that houses equipment to be cleaned by the fluid supply system, wherein the high-pressure pump pallet supports a high-pressure fluid pump and a battery-powered motor connected to the high-pressure fluid pump;
delivering at least one modular battery pallet to the venue, wherein each of the at least one modular battery pallet is independently movable relative to the high-pressure pump pallet, wherein the at least one modular battery pallet supports one or more batteries configured to power the battery-powered motor on the high-pressure pump pallet, and wherein a first modular battery pallet of the at least one modular battery pallet is configured to be electrically coupled at least to the battery-powered motor;
positioning the high-pressure pump pallet proximate to the equipment;
electrically coupling the one or more batteries of the first modular battery pallet to the battery-powered motor; and
supplying a cleaning fluid to the equipment using the high-pressure fluid pump, wherein the high-pressure fluid pump is powered by the battery-powered motor.

15. The method of claim 14, further comprising:
positioning at least some of the at least one modular battery pallet proximate to the high-pressure pump pallet.

16. The method of claim 14, wherein each of the at least one modular battery pallets supports a plurality of batteries, and wherein electrically coupling the one or more batteries to the battery-powered motor further comprises:
electrically coupling each of the plurality of batteries to obtain a desired electrical output; and
electrically coupling the plurality of batteries to the battery-powered motor to provide the battery-powered motor with the desired electrical output.

17. The method of claim 14, wherein the at least one battery pallet includes a second modular battery pallet, and wherein electrically coupling the one or more batteries to the battery-powered motor further comprises:
electrically coupling each of the plurality of batteries of the first battery pallet to obtain a first desired electrical output;
electrically coupling each of the plurality of batteries of the second battery pallet to obtain a second desired electrical output;
electrically coupling the plurality of batteries of the first battery pallet to the plurality of batteries of the second battery pallet to obtain an overall electrical output from the first and second desired electrical outputs; and
coupling the plurality of batteries of the first modular battery pallet to the electrically-powered motor to provide the electrically-powered motor with the overall electrical output.

* * * * *